US00RE43012E

(19) United States
(12) Reissued Patent
Rashid et al.

(10) Patent Number: US RE43,012 E
(45) Date of Reissued Patent: Dec. 13, 2011

(54) QUICK PLASTIC FORMING OF ALUMINUM ALLOY SHEET METAL

(75) Inventors: Moinuddin S. Rashid, Bloomfield Hills, MI (US); Kulsum Rashid, legal representative, Bloomfield Hills, MI (US); Chongmin Kim, Bloomfield Township, MI (US); Edward F. Ryntz, Warren, MI (US); Frederick I. Saunders, Addison, MI (US); Ravi Verma, Shelby Township, MI (US); Sooho Kim, Troy, MI (US); Paul E. Krajewski, Sterling Heights, MI (US)

(73) Assignee: GM Global Technology Operations LLC, Detroit, MI (US)

(21) Appl. No.: 10/122,668

(22) Filed: Apr. 15, 2002

Related U.S. Patent Documents

Reissue of:
(64) Patent No.: 6,253,588
Issued: Jul. 3, 2001
Appl. No.: 09/545,500
Filed: Apr. 7, 2000

(51) Int. Cl.
*B21D 26/02* (2011.01)

(52) U.S. Cl. ..... 72/57; 72/60; 29/421.1

(58) Field of Classification Search ..... 72/57, 58, 72/60, 61; 29/421.1
See application file for complete search history.

(56) References Cited

U.S. PATENT DOCUMENTS 4,616,499 A * 10/1986 Gray ..... 72/56
4,645,543 A * 2/1987 Watanabe et al. ..... 148/552
4,874,578 A * 10/1989 Homberger et al. ..... 420/541
5,309,747 A * 5/1994 Yasui ..... 72/60
5,372,027 A * 12/1994 Roper et al. ..... 72/60
5,819,572 A * 10/1998 Krajewski ..... 72/42
5,974,847 A * 11/1999 Saunders et al. ..... 72/57
6,047,583 A * 4/2000 Schroth ..... 72/60
6,253,588 B1 * 7/2001 Rashid et al. ..... 72/57

OTHER PUBLICATIONS

Mayo et al, "Superplastic in Metals, Ceramics, and Intermetalics", Apr. 16-19, 1990, Materails Research Society, vol. 196, 199.*
Dunwoody et al, "Mechanical Properties of 5083 SPF After Superplastic Deformation," Materials Society Symposium Proceedings, vol. 196, Apr. 1990, pp. 161-166.
Hecht et al, "Mechanical Properties of SP 5083 Aluminum After Superplastic Forming," *Superplasticity and Superplastic Forming,* Feb. 1995, pp. 259-266.
Nakamura et al, "A New Process for Small Boat Production Based on Aluminum Hot-Blow Forming (ABF)," *Journal of Materials Processing Technology* 68 (1997), pp. 196-205.

* cited by examiner

*Primary Examiner* — David B Jones

(57) ABSTRACT

A method is disclosed for stretching magnesium-containing aluminum alloy sheet stock into intricate shapes such as are required in automotive body panels. The sheet stock, at a temperature in the range of about 400° C. to about 510° C., is stretched under the pressure of a working gas into conformance with the surface of a forming tool. The sheet forming pressure is increased continually in a controlled manner from ambient pressure to a final forming level in the range of about 250 psi to about 500 psi or higher. A portion of the sheet can experience strain rates substantially higher than $10^{-3}$ $sec^{-1}$ and the forming of the sheet can be completed within 12 minutes.

66 Claims, 2 Drawing Sheets

QUICK PLASTIC FORMING OF ALUMINUM ALLOY SHEET METAL

Matter enclosed in heavy brackets [ ] appears in the original patent but forms no part of this reissue specification; matter printed in italics indicates the additions made by reissue.

TECHNICAL FIELD

This invention pertains to the forming of certain aluminum alloy sheets into automotive body panels, or other non-automotive parts of complex shape, where portions of the workpiece sheets are highly strained. More specifically, this invention pertains to the forming of such sheet metal workpieces under gas pressure at suitable temperatures and pressures to produce such panels at rates acceptable, for example, for automobile manufacture.

BACKGROUND OF THE INVENTION

Automobile body panels are made by shaping low carbon steel or aluminum alloy sheet stock into inner and outer panel shapes. The number of sheet metal pieces that must be formed and welded or otherwise attached together to form the vehicle body depends upon the design shape of the panels and the formability of the sheet metal. It is desirable, both from the viewpoint of manufacturing cost and fit and integrity of the assembled structural panels, to make the body from as few parts as possible. Other manufacturing operations are likewise affected by the complexity of a product shape that can be formed from the starting sheet metal. Thus, there is always an incentive to devise more formable metal alloys and better forming processes so that relatively few parts of more complex shape can be made and joined to make a car body or other product rather than welding or bolting together a myriad of smaller, simpler pieces.

R. L. Hecht and K. Kannan made an assessment of using superplastic forming (SPF) of a commercial SP aluminum alloy 5083. This work and assessment is described in their publication, "Mechanical Properties of SP 5083 Aluminum After Superplastic Forming" in the monograph, Superplasticity and Superplastic Forming, published by The Minerals, Metals and Materials Society in 1995. They used an AA5083 that had been processed to exhibit superplasticity and they observed that the alloy exhibited high elongation when tested uniaxially at temperatures of 500° C. and above at strain rates of $10^{-4}$ sect$^{-1}$ to $10^{-3}$ sec$^{-1}$.

Hecht and Kannan formed front cross member reinforcement brackets for automobiles by superplastic forming. The SP 5083 brackets were formed at 490° C. with 0.45 MPa (65 psi) gas pressure on a male forming tool without back pressure. They reported a forming time per part of approximately 40 minutes. While their practice formed a part of complex shape in a single step, the time required was far too long for practical automobile manufacturing applications.

Later, Nakamura et at of Honda R&D Co. and related Honda companies reported the superplastic hot-blow forming of a boat hull using an aluminum alloy of AA5083-like composition. Their work was published as "A new process for small boat production based on aluminum hot-blow forming (ABF)", Journal of Materials Processing Technology, 68 (1997) 196-205. The AA5083-type alloy (aluminum with 4.5% magnesium and small amounts of manganese and chromium, and the impurities iron and silicon) exhibited high elongation at temperatures between 510° C. and 550° C. and strain rates of $10^{-4}$ sec$^{-1}$ to $10^{-3}$ sec$^{-1}$. The Honda workers required half an hour to one hour to complete forming of the boat hull. Again, the SPF process as used permitted the forming of a complex shape but the strain rate was too low and the cycle time too long for automobile manufacturing.

The U.S. Pat. No. 4,645,543 to Watanabe et al. describes a process for making modified AA5083 sheet material having "excellent superplasticity." These alloys were composed, by weight, of 3.5% to 6% magnesium; 0.12% to 2% copper; at least one of 0.1% to 1% manganese, 0.05% to 0.35% chromium, and/or 0.03% to 0.25% zirconium; and the balance of aluminum and unavoidable impurities. Maximum incidental amounts of many other elements are also specified. After chill casting and a carefully specified schedule of hot rolling followed by cold rolling, some 18 different superplastic sheet samples, 1.6 mm thick, were made for testing.

The Watanabe et al. superplastic aluminum-magnesium-copper alloy samples were prepared as tensile test bars, heated to 530° C. and subjected to an initial strain rate of $1.1\times10^{-3}$/sec to determine total superplastic elongation. Among the many alloy samples, total elongation values of from 330% to 800% were obtained.

The low strain rate of the Watanabe et al. superplastic tensile test specimens is typical of superplastic forming strain rates for these magnesium-containing aluminum alloys as reported in the Hecht et at and Nakamura et al publications. Just as the Watanabe tests would take many, many minutes in order to determine the final elongation at 530° C., SPF forming operations on modified AA5083 sheet metal stock have taken 30, 40 or 60 minutes or more to form into a shaped article.

It is an object of this invention to provide a high strain rate, stretch forming process for high elongation (superplastic), magnesium-containing aluminum alloys, like AA5083, to enable the practical production of robust automobile body panels and the like of complex shape and highly strained regions. While this practice was devised for automobile manufacture, it can obviously be used to make other usable articles.

SUMMARY OF THE INVENTION

This invention includes a materials component and a forming process component. The rapid sheet metal forming process component of this invention was discovered while working with sheet stock of a specific aluminum alloy family that had been processed to a stable, uniformly fine grain structure in the range of about 5 to 30 micrometers. A preferred alloy is Aluminum Alloy 5083 having a typical composition, by weight, of about 4% to 5% magnesium, 0.3 to 1% manganese, a maximum of 0.25% chromium, about 0.1% copper, up to about 0.3% iron, up to about 0.2% silicon, and the balance substantially all aluminum. Generally, the alloy is first hot and then cold rolled to a thickness from about one to about four millimeters.

In the AA5083 alloys, the microstructure is characterized by a principal phase of a solid solution of magnesium in aluminum with well-distributed, finely dispersed particles of intermetallic compounds containing the minor alloying constituents, such as $Al_6Mn$.

Such aluminum alloys are known to be capable of experiencing several hundred percent elongation in a high temperature tensile test at a low strain rate. For example, when a tensile test specimen has been heated to about 550° C. and subjected to tensile loading at a rate of $10^{-4}$ to $10^{-3}$ second$^{-1}$, the specimen may experience an elongation of up to 500% before failure. Such sheet alloys have been used in superplastic forming (SPF) processes at relatively high forming temperatures and low strain rates. In the case of AA5083 sheet, the accepted practice for SPF stretch forming or drawing of the material involves undertaking such forming operation at 490° C. to 560° C. and at low strain rates like those stated above. This means that a forming press can only complete one to three cycles per hour, far below the productivity expected and required in the automotive industry.

In accordance with a preferred embodiment of the subject invention, large AA5083-type aluminum-magnesium alloy sheet stock may be formed into a complex three-dimensional shape with high elongation regions, like an SPF-formed part, at much higher production rates than those now achieved by SPF practices. The magnesium-containing, aluminum sheet is heated to a forming temperature in the range of about 400° C. to 510° C. (750° F. to 950° F.). The forming may often be conducted at a temperature of 460° C. or lower. The heated sheet is stretched against a forming tool and into conformance with the forming surface of the tool by air or gas pressure against the back surface of the sheet. The fluid pressure is preferably increased continuously or stepwise from 0 psi gage at initial pressurization to a final pressure of about 250 to 500 psi (gage pressure, i.e., above ambient pressure) or higher. During the first several seconds up to about, e.g., one minute of increasing pressure application, the sheet accommodates itself on the tool surface. After this initial period of pressurization to initiate stretching of the sheet, the pressure can then be increased at an even faster rate. Depending upon the size and complexity of the panel to be formed, such forming can normally be completed in a period of about two to twelve minutes, considerably faster than realized in superplastic forming.

As an example, an automobile decklid outer panel was stretch formed from AA5083 sheet, 1.2 millimeter thick. The decklid panel (illustrated in FIG. 1) represented a challenging one-step, one-piece forming operation because of the normal curvature of a decklid in combination with an integral, deep, generally rectangular license plate recess.

The sheet was heated to about 446° C. (835° F.) for stretch forming against the sculptured surface of a forming tool. The sheet was held against the periphery of the tool and air pressure was initially applied to the back of the sheet. The pressure was continually increased at an increasing rate of application to 450 psi over a period of 260 seconds. The pressure was maintained at 450 psi for the next 60 seconds. The total forming time under pressure for the decklid outer panel was only 320 seconds. The formed part was lifted from the stretch form press for cooling, cleaning and trimming before being assembled with a complementary inner panel. Further development effort led to an even faster forming cycle for the decklid outer panel. In the faster forming cycle, analysis of progressively formed parts revealed that highly strained regions of the parts experienced strain rates greater than $10^{-3}$ $sect^{-1}$ and as high as $10^{-2}$ $sec^{-1}$.

Thus, by working the suitably fine grained, aluminum so alloy sheet at significantly lower temperatures and continuously increased, higher gas pressures than typical SPF practices, significantly faster and more practical forming (at least for the automobile industry) times are achieved.

Other objects and advantages of the invention will become more apparent from the following detailed description of a preferred embodiment. In the description, reference will be had to the drawing figures that are described in the next section.

DESCRIPTION OF PREFERRED EMBODIMENTS

Figure 1:
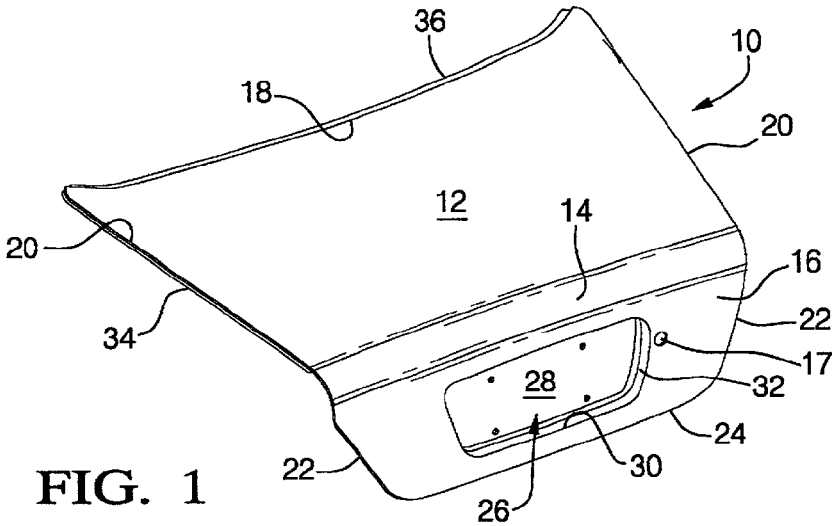
FIG. 1 shows an automobile decklid outer panel after forming in accordance with this invention.

In accordance with this invention, the practice is to use a magnesium-containing (for example, up to about 6% by weight magnesium) aluminum alloy sheet metal but process it at a temperature region that is lower than the typical temperature regions chosen for reliable and repeatable superplastic forming. The practice is also to subject the heated sheet metal to increasing working pressures that strain the sheet metal at a rate greater than those practiced in superplastic forming. When complex shapes having highly strained regions are formed from a sheet metal blank, it is expected that those regions will experience strain rates of $10^{-3}$ $sec^{-1}$ and higher.

Thus, a suitable magnesium-containing aluminum alloy sheet is heated to a temperature of about 400° C. to 510° C. (750° F. to 950° F.). Typically, the sheet metal is formed by a stretch forming process in which the heated sheet is held between two tool halves that clamp it at its periphery, and working gas pressure (e.g., air, nitrogen or argon) is introduced against one side of the sheet to force it into conformance with the forming surface of a forming tool. In stretch forming, the peripheral edge of the sheet is held fixed between the complementary forming tool halves, and the interior of the heated sheet is literally stretched into conformance against the shaping surface of a tool half by the gas pressure applied to the opposite side of the sheet within the tool.

The air or gas pressure is slowly but continuously increased above ambient pressure. While the pressure is still relatively low, e.g., of the order of 5 to 10 psi, the hot metal is stretched and brought into initial contact with the forming surface. At this time, generally less than one minute into the forming, the sheet accommodates itself on the tool, particularly at entry radii into pockets and flanges. The pressure can then be raised at an increasing rate. As the pressure is further continuously raised at a controlled and normally increasing rate to a final level, typically in the range of 250 to 500 psi, the rate of stretching increases and more of the sheet is stretched against the shaping surface of the tool. Continued pressure stretches the sheet into full conformance with the tool. In this quick stretch forming of many articles, such as automobile body panels, the total forming time at such temperatures and working fluid pressures is surprisingly low, e.g., up to about 12 minutes per part or less.

The practice of the invention will be illustrated in connection with the forming of an automobile decklid outer panel such as is depicted at 10 in FIG. 1. Decklid 10 is of familiar shape with a curved, generally horizontal upper portion 12 leading to bend 14 to a curved, generally vertical portion 16 that will define part of the rear of the car body. Of course, decklid 10 is shaped to enclose the trunk compartment of the vehicle and to carry a latch and lock with pierced key hole 17 and often a license plate.

Horizontal portion 12 has a forward edge 18 that is adapted to be fixed to the car body usually below the rear window and side edges 20 that fit close to the rear fender regions of the car body. Vertical portion 16 also has three edges. Side edges 22 fit close to the car body, usually between the rear stop lights, and bottom edge 24 fits close to the body near the bumper level of the vehicle.

The decklid 10 is of complex curvature, both across the width of the decklid and across the length of its horizontal surface and down its vertical surface. But a particularly difficult forming step in making the decklid is stretching the severely indented region 26 for holding a license plate. Recessed region 26 includes flat portion 28 with four very steep side walls. Two side walls 30 and 32 are seen in the generally perspective view of FIG. 1. In a typical stamping, the forming of deep recess 26 is very difficult to accomplish within the same sheet metal piece as the rest of the decklid is formed.

Figure 3:
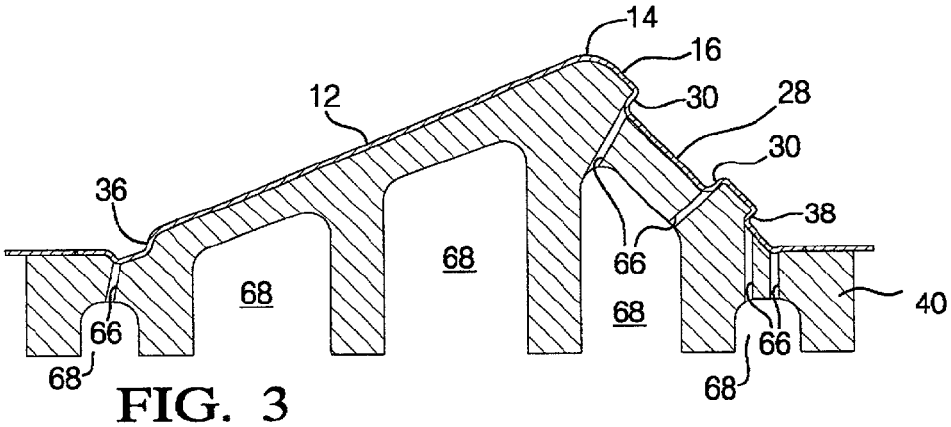
FIG. 3 is a cross section of the forming tool of FIG. 2 with the formed panel.

In addition to the recessed portion 26, the decklid outer panel is also formed with flanges 34 (one shown in FIG. 1) at side edges 20 of the horizontal portion 12 and a panel break 36 at the rear edge 18 of horizontal portion 12. Bottom edge 24 also has a flange 38 seen in FIG. 3. The combination of the bend 14, the severe angles of the flanges 34 and 38 and the steep walls 30, 32 and flat bottom 28 of recessed portion 26 of the decklid require high local elongation of the sheet metal and are difficult to form in a single workpiece.

A decklid outer panel was formed in accordance with this invention starting with a blank of AA5083 sheet metal. The blank size was 47 inches by 70 inches and 0.048 inch (1.2 mm) thick. The nominal composition of the aluminum alloy was, by weight, 4.5% magnesium, 0.7% manganese, 0.15% chromium, less than 0.2% iron, less than 0.1% silicon, and the balance substantially aluminum. An aqueous suspension of fine boron nitride lubricant particles was sprayed onto both sides of the aluminum alloy blank surface and the material dried to produce a thin film of boron nitride.

The blank was heated to a forming temperature in the range of 825° F. to 845° F. (about 441° C. to 452° C.).

Figure 2:
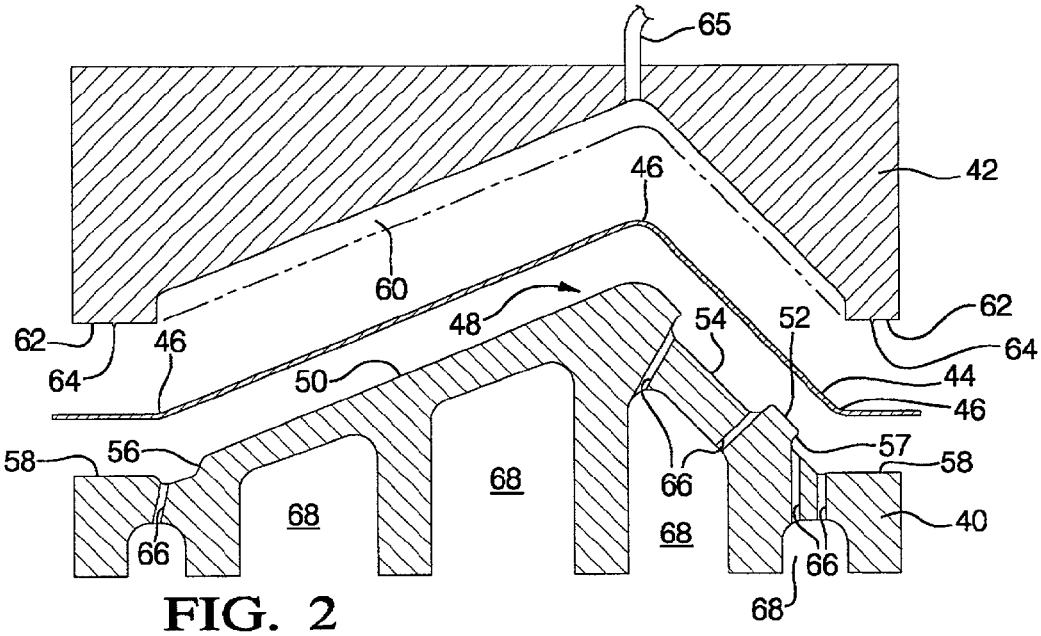
FIG. 2 is a cross-sectional view of upper and lower complementary stretch form tools, with interposed aluminum sheet stock, for forming the decklid outer panel of FIG. 1.

In FIG. 2 is illustrated two halves of forming tool (lower 40, upper 42) for stretch forming a previously bent and heated aluminum alloy blank 44 into the decklid outer panel shown in FIG. 1. In accordance with a preferred embodiment, a flat, cleaned and lubricated sheet blank is heated with a first tool (not shown) that heats the blank to its forming temperature and forms three simple bends 46 so that the blank 44 easily fits between tool halves 40 and 42 for stretch forming.

The lower tool half 40 contains a complex forming surface 48 that defines the back side of the one-piece outer panel 10. The lower tool half 40 is in section but is seen to contain a forming surface portion 50 that defines the horizontal portion 12 of the decklid. Another portion 52 of the tool shaping surface forms the vertical portion 16 of the decklid. Still another portion 54 forms the license plate recess. Other portions 56 and 57 form flanges at the forward edge of the horizontal portion of the decklid and the bottom of the vertical portion. The periphery 58 of the rectangular lower shaping tool 40 has a flat surface for clamping and sealing the peripheral portion of the aluminum alloy blank.

The upper tool half 42 is complementary in shape to the male forming tool 40 and is provided with a shallow cavity 60 for the introduction of a high pressure working gas, e.g., air, nitrogen or argon, against the back side of the blank 44. The periphery 62 of the upper tool half 42 is flat except for a sealing bead 64 which is adapted to engage the perimeter of the aluminum blank and to seal against working gas pressure loss when the upper tool half 42 is closed against the blank 44 and lower tool half 40. The upper tool half 42 also includes a working gas inlet 65 to admit fluid pressure against the back side of the blank 44. Means for controlling the pressure of the working gas is also provided.

The lower forming tool half 40 is hollowed out in regions 68 to reduce its mass and to facilitate machining of a plurality of vent holes 66 for air or other entrapped gas to escape from below the blank 44 so that the blank can subsequently be stretched into strict conformance with the shaping surface 48 of the forming tool half 40.

Electrical resistance heating means, not shown, are provided to maintain the shaping tools at the desired temperature of about 825° F. to 845° F. The blank may be heated in an oven to its working temperature or preferably, as described above, it may be heated in a first tool that simply heats the workpiece and commences its formation such as bending it to form simple bends 46 like that illustrated in FIG. 2. In either case, a flat blank or a bent blank such as that illustrated in FIG. 2 is positioned, typically by robot manipulators, between the opened upper 42 and lower 40 forming tool. Once the blank 44 is in position, the upper tool half 42 is lowered against the upper peripheral surface of the blank and air is vented from the lower tool half so that the periphery of the blank is tightly clamped between the complementary holding surfaces 58, 62 of the lower and upper tool. Gas pressure is then applied to the back surface of the blank, the visible surface of the formed decklid.

In accordance with this embodiment, the gas pressure was applied and increased over a period of 320 seconds at pressure levels in accordance with the following table. The pressure was increased generally in a continuous manner with gage values recorded at 20 second intervals.

| Time (seconds) | Pressure (psi) |
|---|---|
| 0 | 0 |
| 20 | 15 |
| 40 | 30 |
| 60 | 45 |
| 80 | 60 |
| 100 | 90 |
| 120 | 120 |
| 140 | 150 |
| 160 | 200 |
| 180 | 250 |
| 200 | 300 |
| 220 | 350 |
| 240 | 400 |
| 260 | 450 |
| 280 | 450 |
| 300 | 450 |
| 320 | 450 |

It is seen that the pressure increased from ambient to 15 psi gage in 20 seconds and further increased steadily to a level of 450 psi after about 260 seconds. The pressure was maintained at 450 psi for a period of 60 seconds or one minute. Curve D of FIG. 4 graphically illustrates the with time as stated in the table, and it is seen that the forming pressure is steadily increased at an ever-increasing rate until it reached the maximum of 450 psi, at which level it is held for about one minute. The total forming time was five minutes and twenty seconds. In that time period, the blank 44 is stretched against the forming tool. With a further increase in pressure, the horizontal 12 and vertical 16 portions of the decklid outer panel 10 are substantially formed. Then with the further increase in pressure, the vertical portion is forced into compliance with the recess forming portion 54 of the tool 40. Then by holding the pressure at 450 psi, the final compliance of the sheet metal with the forming surface is obtained. At the completion of the 320 second period, the aluminum alloy sheet is found to be deformed precisely into conformation with the forming surface of the shaping tool. Thereafter, the upper tool is opened and the decklid panel 10 is removed from the working tool for cooling, trimming and operations of the like.

The strategy of the process is to relatively slowly increase the forming pressure and begin the stretching of the tightly held sheet against the prominent portions of the forming tool. Once the sheet metal flow is started and the sheet is stretched into the cavities of the forming tool, the pressure is further increased, preferably at a faster than linear rate with time, to bring the sheet into contact with most of the forming surface of the tool. The final pressure level completes the compliance of the sheet with the forming surface. Often, the pressure is advantageously held at a final level for a minute or so to complete the forming in high deformation regions such as the license plate recess area of the lid. Thus, the working gas pressure is increased from a low initial value to a final pressure of 250 to 500 psi or more.

A decklid inner panel was also formed by the subject process. The inner panel is not specifically illustrated. It had a shape complementary to that of the outer panel, but it did not have the license plate recess. However, it did have rectangular cross-section strengthening ribs.

Figure 5:
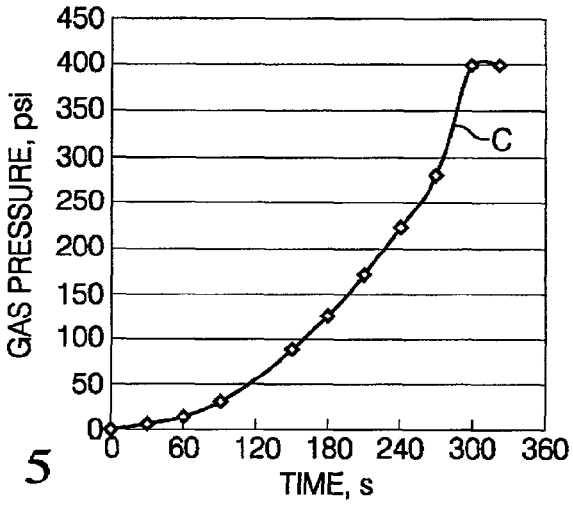
FIG. 5 is a graph of the production pressure vs. time for a decklid inner panel complementary to the outer panel of FIG. 1.

The blank for the inner panel was made of the same aluminum alloy AA5083 composition. It had a thickness of 0.63 inches (1.6 mm) and a blank size of 43.5 inches by 64 inches. The inner blank was heated to a temperature in the range of 835° F. to 860° F. The blank was formed by stretch forming operation in complementary tooling similar to that depicted in FIGS. 2 and 3. The air pressure was applied in accordance with a different schedule from that used on the outer panel. The forming pressure schedule is shown in tabular form below and in the graph of FIG. 5.

| Time (sec) | Pressure (psi) |
|---|---|
| 0 | 0 |
| 30 | 6 |
| 60 | 14 |
| 90 | 32 |
| 120 | 56 |
| 150 | 89 |
| 180 | 127 |
| 210 | 173 |
| 241 | 225 |
| 270 | 282 |
| 300 | 400 |
| 323 | 400 |

A lower final air pressure was used in the formation of the less severe decklid inner panel. It is seen that the pressure was initially applied up to a low level of 6 psi over the first 30 seconds of forming. The pressure was more than doubled to 14 psi over the next 30 seconds. It is believed that during this period the sheet was stretched over the cavity edges of the forming tool and gained initial entry into the cavity. Thereafter, the pressure was increased at a higher rate for the next 240 seconds or a total of five minutes when the maximum pressure of 400 psi was attained. This phase of the forming process accomplished much of the shaping of the panel. The 400 psi pressure was held for an additional 23 seconds to insure full compliance of the panel with the forming surface. Curve C of FIG. 5 graphically illustrates the time pressure relationship of the stretch forming of the inner panel.

After the above forming schedule was completed, the upper tool was raised and the formed part was removed. When the part had cooled it was trimmed, cleaned and was ready for assembly into a decklid.

This practice of substantially reducing the forming temperature from recognized SPF process specifications and increasing the rate of stretch forming gave surprisingly good results. The quality of the formed parts was excellent and the cycle times much lower than had been experienced in the prior art. It was decided to see if the above-described outer decklid panel could br formed at the same temperature and on the same production tooling described above but at an even faster time-pressure forming cycle. This was successfully accomplished using the cycle stated in the following table.

| Time (sec) | Pressure (psi) |
|---|---|
| 0 | 0 |
| 20 | 25 |
| 40 | 50 |
| 60 | 75 |
| 120 | 200 |
| 160 | 300 |
| 180 | 300 |
| 200 | 300 |

It is seen that by increasing the rate of pressure application to the 835° F. (nominally) sheet, the forming cycle was decreased from 320 seconds to 200 seconds, a little over three minutes.

Following the completion of this successful 200 second forming cycle for rapidly forming the outer decklid panel, it was decided to experimentally measure strain rates in high strain regions of the formed part. Thickness measurements were made in different portions of a finished part and it was determined that the greatest strain occurred in the bottom corners of the license plate recess. Following this determination, a series of five forming cycles like that summarized in the above table were started, but they were interrupted after 20, 40, 60, 120 and 160 seconds, respectively, of the forming cycle. After each interrupted cycle, a thickness measurement was made on the then thinnest portion of the partly-formed material. Based on the thickness of the sample and the known forming time, strain rates were determined for the forming cycle.

After 20 seconds, the strain rate was about $5\times10^{-3}$ sect$^{-1}$. From 30 seconds through 90 seconds of stretching, the part had a nearly constant maximum strain rate of about $10^{-2}$ sect$^{-1}$. The sample taken after 100 seconds was seen to be nearly fully formed and the average strain rate had then decreased to about $3\times10^{-3}$ sec$^{-1}$. Thus, by experiment it is determined that actual strain rates in the subject quick plastic forming process are substantially faster (e.g., 10 to 100 times faster) than strain rates considered possible in conventional SPF processing of these magnesium-containing aluminum alloys.

This practice of rapid plastic forming aluminum alloy sheet metal at temperatures in the range of about 400° C. (752° F.) to 510° C. (950° F.) at ultimate working gas pressures of 250 psi to 500 psi is applicable to magnesium-containing, aluminum alloys where the major portion of the magnesium is in solid solution in the aluminum. Several examples of similar alloys are described, e.g., in the Watanabe patent U.S. Pat. No. 4,645,543. Especially good forming times and results have been obtained with alloys comprising, by weight, up to about 4% to 6% magnesium, about 0.3 to 1% manganese, a maximum of about 0.25% chromium, about 0.1% copper, up to about 0.3% iron, up to about 0.2% silicon, and the balance substantially all aluminum and incidental impurities. With these magnesium-aluminum alloys, sheet metal forming times of 2 to 12 minutes, depending upon part complexity, at forming temperatures of 820° F. to 860° F. have produced high quality automotive body panels as described above.

Figure 4:
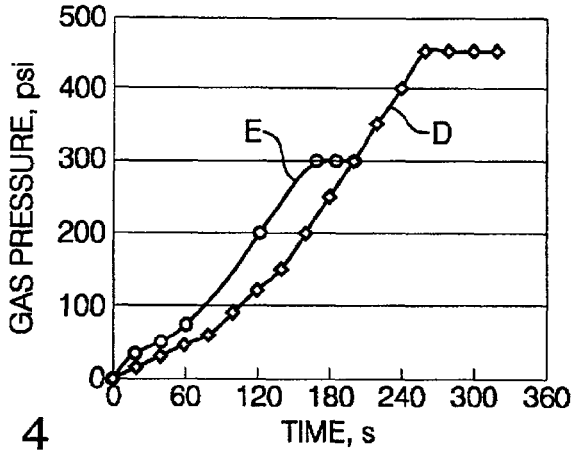
FIG. 4 is a graph of two production pressure vs. time forming cycles for the decklid outer panel of FIG. 1.
Figure 6:
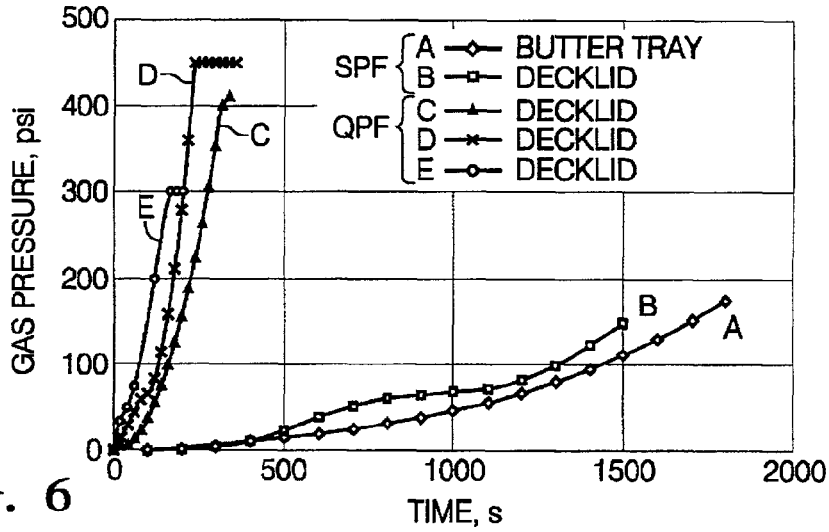
FIG. 6 is a graph containing the pressure vs. time curves of FIGS. 4 and 5 as comparative pressure vs. time curves of two comparable superplastic forming practices on the same magnesium-containing aluminum alloys.

FIG. 6 graphically compares representative forming cycles, gas pressure in psi vs. time in seconds, for the subject quick plastic forming (QPF) process and the conventional superplastic forming (SPF) process as applied to the same AA5083 alloy. Curves D and E depict the same pressure-time forming cycles for the decklid outer panel that are shown in FIG. 4, but the time scale is compressed to allow for the superplastic forming cycles to be included in the figure. Similarly, curve C depicts the pressure-time forming cycle for the decklid inner panel shown in FIG. 5. In contrast, curve B is the pressure-time forming cycle curve for the SPF stretch forming of the same decklid outer panel as described above. In the SPF process the large AA5083 sheet was heated to over 900° F. for forming on the same tooling as the curves D and E cycles. This required that the strain rates experienced be much lower and, thus, that the working gas pressure be increased much more slowly than in the quick forming process summarized in curves D and E in FIG. 4. In using the SPF technology to form the outer panel on the same tooling, a forming time of 1500 seconds (25 minutes) was required.

For further comparison, SPF technology was also used to form a "butter tray" which is a deep rectangular container with flat sides, bottom and edges for holding a slab of butter. The shape of the butter tray is like that of the license plate recess in the decklid outer panel and is a prototype difficult shape to stretch form from flat sheet metal stock. The SPF pressure-time forming cycle for the butter tray at over 900° F. is pressure vs. time curve AM FIG. 6. It is seen that nearly 30 minutes was required to form the tray using the SPF practice of high forming temperatures and low strain rates.

Thus, this invention provides a new and practical process for the quick plastic deformation of aluminum alloy sheet stock by a metal stretching operation. The fast stretch forming operation is accomplished by using a forming temperature well below the SPF temperature for the alloy and stretching the sheet much faster than can be tolerated in SPF forming.

While this invention has been described in terms of some specific embodiments, it will be appreciated that other forms can readily be adapted by one skilled in the art. Accordingly, the scope of this invention is to be considered limited only by the following claims.

What is claimed is:

1. A method of stretch forming a magnesium-containing, aluminum alloy sheet into a product, said alloy comprising up to about 6% by weight magnesium and having a microstructure characterized by a grain size in the range of about 5 to 30 micrometers, said method comprising heating said sheet to a temperature in the range of about 400° C. to about 510° C. and stretching at least a portion of the heated sheet so that one side of the sheet is brought into conformance with a shaping surface by applying working gas pressure to the opposite side of the sheet, said stretching being accomplished by continually increasing said pressure from ambient pressure to a final stretching pressure in the range of about 250 psi to about 500 psi above ambient pressure and completing said stretching within a period of up to about 12 minutes.

2. A method as recited in claim 1 comprising increasing the rate of increase of said pressure at a time after about one minute of application of said pressure to a final stretching pressure in said range of about 250 psi to about 500 psi.

3. A method as recited in claim 1 comprising increasing said pressure to a level of 10 psi to 50 psi during the first minute of the application of said pressure and, thereafter, increasing said pressure at a rate faster than a linear rate of increase to a final stretching pressure in the range of about 250 psi to about 500 psi.

4. A method as recited in any of claims 1–3 in which said magnesium-containing aluminum alloy comprises, by weight, about 3.5% to about 6% magnesium as a solid solution in said aluminum.

5. A method as recited in any of claims 1–3 in which said aluminum alloy comprises, by weight, about 3.5% to about 6% magnesium, about 0.1% to about 1% manganese and aluminum.

6. A method as recited in any of claims 1–3 in which said aluminum alloy comprises, by weight, about 4% to 5% magnesium, about 0.3% to 1% manganese, up to about 0.25% chromium, up to about 0.1% copper, up to about 0.3% iron, up to about 0.2% silicon and aluminum.

7. A method of forming an article of manufacture from superplastic magnesium-containing aluminum alloy sheet stock, comprising providing a sheet forming tool having a peripheral surface against which the periphery of said sheet stock can be held in sealing engagement and a sheet forming surface within said peripheral surface for forming said sheet, [said tool including means for venting said cavity during the forming of said sheet,]

heating said sheet [to a temperature in said range] and holding said sheet in sealing engagement with said peripheral surface of said tool, said sheet then having a first surface facing said forming surface and an opposite surface, stretching said heated sheet into conformance with said forming surface by applying working gas pressure to said opposite [side] of the sheet, said stretching being accomplished by continually increasing said pressure from ambient pressure to a final stretching pressure in the range of about 250 psi to about 500 psi above ambient pressure and completing said stretching within a period of up to about 12 minutes.

8. A method as recited in claim 7 in which the rate of pressure increase is greater than a linear rate of increase.

9. A method as recited in any of claim 7 or 8 in which said article is an automotive vehicle body panel.

10. A method of stretch forming a magnesium-containing, aluminum alloy sheet into a product, said alloy comprising up to about 6% by weight magnesium and having a microstructure characterized by a grain size in the range of about 5 to 30 micrometers, said method comprising heating said sheet to a temperature in the range of about 400° C. to about 510° C. and stretching at least a portion of the heated sheet so that one side of the sheet is brought into conformance with a shaping surface by applying working gas pressure to the opposite side of the sheet, said stretching being accomplished such that at least a portion of the sheet experiences a strain rate greater than $10^{-3}$ $sec^{-1}$.

11. A method as recited in claim 10 comprising stretching said sheet such that at least a portion of the sheet experiences a strain rate greater than $5\times10^{-3}$ $sec^{-1}$.

12. A method as recited in claim 10 comprising continuously increasing said gas pressure from ambient pressure to a final stretching pressure and completing said stretching within a period of up to about 12 minutes.

13. A method as recited in claim 12 in which said stretching is completed within a period of up to about six minutes.

14. A method as recited in claim 12 in which said stretching is completed within a period of up to about three minutes.

*15. A method of forming an article of manufacture from a metal alloy sheet comprising:*

*providing a sheet forming tool having engagement surfaces for engaging the sheet near peripheral edges thereof so that the sheet can be held in sealing engagement with the sheet forming tool, the sheet forming tool having a sheet forming surface for forming the sheet;*

*heating the sheet and holding the sheet in sealing engagement with the engagement surfaces of the sheet forming tool, the sheet having a first surface facing the sheet forming surface and an opposite surface;*

*stretching the heated sheet into conformance with the forming surface by applying working gas pressure to the opposite surface of the sheet, the stretching being accomplished by applying the pressure in a series of stages comprising a first stage, and a second stage; and wherein the first stage comprises increasing the pressure at a first rate from ambient, and the second stage comprising increasing the pressure at a second rate, and wherein the second stage occurs after the first stage and the second rate is greater than the first rate and further comprising applying a final stretching pressure during the second stage, and wherein the final stretching pressure ranges from about 250 psi to about 500 psi above ambient pressure.*

*16. A method as set forth in claim 15 wherein the stretching further comprising a third stage comprising applying a final forming pressure to the sheet after the second stage, and wherein the final forming pressure is applied at a substantially constant pressure.*

*17. A method as set forth in claim 15 wherein the sheet comprises an aluminum alloy.*

*18. A method as set forth in claim 17 wherein the aluminum alloy comprises magnesium.*

*19. A method as set forth in claim 18 wherein the aluminum alloy comprises magnesium present in an amount, by weight, up to 6 percent of the aluminum alloy.*

*20. A method as set forth in claim 15 wherein the alloy sheet has a microstructure grain size ranging from about 5-30 micrometers.*

*21. A method as set forth in claim 15 wherein the heating of the sheet is conducted so that the temperature of the sheet ranges from about 400° C. to about 510° C.*

*22. A method as set forth in claim 15 wherein the first rate of increasing the pressure is non-linear.*

*23. A method as set forth in claim 15 wherein the second rate of increasing the pressure is non-linear.*

*24. A method as set forth in claim 23 wherein the first rate of increasing the pressure is non-linear.*

*25. A method as set forth in claim 15 wherein the stretching further comprising applying a final stretching pressure after the series of stages, and wherein the final stretching pressure is substantially constant.*

*26. A method as set forth in claim 15 wherein the stretching further comprising applying a final stretching pressure stage after the second stage, and wherein pressure is increased during the final stretching pressure stage at a linear rate.*

*27. A method as set forth in claim 15 wherein the metal sheet comprises an aluminum alloy comprising magnesium present in an amount, by weight, of about 1.0 percent to about 6 percent magnesium.*

*28. A method as set forth in claim 15 wherein the metal sheet comprises an aluminum alloy comprising magnesium present in an amount, by weight, of up to 6 percent, and further comprising additional materials.*

*29. A method as set forth in claim 28 wherein the additional materials consist of manganese, chromium, copper, iron, silicon, and mixtures thereof.*

*30. A method as set forth in claim 15 wherein the stretching of the sheet into conformance with the forming surface is completed in less than 12 minutes.*

*31. A method of forming an article of manufacture from a metal alloy sheet comprising:*

*providing a sheet forming tool having engagement surfaces for engaging the sheet near peripheral edges thereof so that the sheet can be held in sealing engagement with the sheet forming tool, the sheet forming tool having a sheet forming surface for forming the sheet;*

*heating the sheet and holding the sheet in sealing engagement with the engagement surfaces of the sheet forming tool, the sheet having a first surface facing the sheet forming surface and an opposite surface;*

*stretching the heated sheet into conformance with the forming surface by applying a working gas pressure, in a range of about 250 psi to about 500 psi above ambient pressure, to the opposite surface of the sheet, the stretching being accomplished by applying the pressure in a series of stages comprising a first stage, and a second stage; and wherein the first stage comprises increasing the pressure from ambient at a first rate to a first stage ending pressure, and the second stage comprising increasing the pressure at a second rate from the first stage ending pressure, and wherein the second rate is greater than the first rate, and wherein the second rate is non-linear.*

*32. A method of forming an article of manufacture from a metal alloy sheet comprising:*

*providing a sheet forming tool having engagement surfaces for engaging the sheet near peripheral edges thereof so that the sheet can be held in sealing engagement with the sheet forming tool, the sheet forming tool having a sheet forming surface for forming the sheet;*

*heating the sheet and holding the sheet in sealing engagement with the engagement surfaces of the sheet forming tool, the sheet having a first surface facing the sheet forming surface and an opposite surface;*

*stretching the heated sheet into conformance with the forming surface by applying working gas pressure, in a range of about 250 psi to about 500 psi above ambient pressure, to the opposite surface of the sheet, the stretching being accomplished by applying the pressure in a series of nonlinear pressure increasing stages comprising at least a first stage and a second stage, and wherein the average rate of pressure increase in the first stage is greater than the average rate of pressure increase in the second stage.*

*33. A method of forming an article of manufacture from an aluminum alloy sheet comprising:*

*providing a sheet forming tool having engagement surfaces for engaging the sheet near peripheral edges thereof so that the sheet can be held in sealing engage-*

*ment with the sheet forming tool, the sheet forming tool having a sheet forming surface for forming the sheet;*

*heating the sheet to a temperature ranging from 400° C. to 510° C. and holding the sheet in sealing engagement with the engagement surfaces of the sheet forming tool, the sheet having a first surface facing the sheet forming surface and an opposite surface;*

*stretching the heated sheet into conformance with the forming surface by applying working gas pressure, in a range of about 250 psi to about 500 psi above ambient pressure, to the opposite surface of the sheet, the stretching being accomplished by applying the pressure so that at least a portion of the sheet experiences a strain rate greater than* $5\times10^{-3}$ $sec^{-1}$.

*34. A method of forming an article of manufacture from a metal alloy sheet stock comprising:*

*providing a sheet forming tool having engagement surfaces for engaging the sheet near peripheral edges thereof so that the sheet can be held in sealing engagement with the sheet forming tool, the sheet forming tool having a sheet forming surface for forming the sheet;*

*heating the sheet and holding the sheet in sealing engagement with the engagement surfaces of the sheet forming tool, the sheet having a first surface facing the sheet forming surface and an opposite surface;*

*applying pressure, in a range of about 250 psi to about 500 psi above ambient pressure, on the heated sheet in a series of stages to bring the sheet into conformance with the forming surface, the series of stages comprising a first stage, a second stage, and a final forming stage; and wherein of the pressure applied in the first stage is increased at a first average rate, and wherein the pressure applied in the second stage is at a second average rate that is greater than a first average rate, and wherein the pressure applied in the final forming stage is substantially constant.*

*35. A method of forming an article of manufacture from a metal alloy sheet comprising:*

*providing a metal alloying sheet stock having a microstructure grain size ranging from about 5-30 micrometers, and providing a sheet forming tool having engagement surfaces for engaging the sheet near peripheral edges thereof so that the sheet can be held in sealing engagement with the sheet forming tool, the sheet forming tool having a sheet forming surface for forming the sheet;*

*heating the sheet and holding the sheet in sealing engagement with the engagement surfaces of the sheet forming tool, the sheet having a first surface facing the sheet forming surface and an opposite surface;*

*applying pressure, in a range of about 250 psi to about 500 psi above ambient pressure, on the heated sheet in a series of stages to bring the sheet into conformance with the forming surface, the series of stages comprising a first stage, a second stage, and a final forming stage; and wherein the pressure applied in the first stage is increased at a first rate, and wherein the pressure applied in the second stage is at a second rate that is greater than a first rate, and wherein the pressure applied in the final forming stage is substantially constant.*

*36. A method as set forth in claim 35 wherein the heating of the sheet is conducted so that the sheet has a temperature less than 510° C.*

*37. A method as set forth in claim 35 wherein the heating of the sheet is conducted so that the sheet has a temperature ranging from 400° C. to 510° C.*

*38. A method as set forth in claim 35 wherein the metal alloy is an aluminum alloy.*

*39. A method as set forth in claim 35 wherein the rate of pressure increase in the first stage is non-linear.*

*40. A method as set forth in claim 35 wherein the rate of pressure increase in the second stage is non-linear.*

*41. A method as set forth in claim 40 wherein the rate of pressure increase in the second stage is non-linear.*

*42. A method of forming an article of manufacture from an aluminum alloy sheet comprising:*

*providing a sheet forming tool having engagement surfaces for engaging the sheet near peripheral edges thereof so that the sheet can be held in sealing engagement with the sheet forming tool, the sheet forming tool having a sheet forming surface for forming the sheet;*

*heating the sheet and holding the sheet in sealing engagement with the engagement surfaces of the sheet forming tool, the sheet having a first surface facing the sheet forming surface and an opposite surface;*

*stretching the heated sheet into conformance with the forming surface by applying working gas pressure, in a range of about 250 psi to about 500 psi above ambient pressure, to the opposite surface of the sheet, the stretching being accomplished by applying the pressure in a series of stages comprising a first stage, and a second stage; and wherein the first stage comprises increasing the pressure at a first average rate from ambient, and the second stage comprising increasing the pressure at a second average rate, and wherein the second stage occurs after the first stage, and the second average rate is greater than the first average rate.*

*43. A method as set forth in claim 42 further comprising applying a final forming pressure to the sheet after the second stage, and wherein the final forming pressure is applied at a substantially constant pressure.*

*44. A method as set forth in claim 42 wherein the aluminum alloy comprises magnesium.*

*45. A method as set forth in claim 44 wherein the magnesium is present in an amount, by weight, up to 6 percent of the aluminum alloy.*

*46. A method as set forth in claim 42 wherein the alloy sheet has a microstructure grain size ranging from about 5-30 micrometers.*

*47. A method as set forth in claim 42 wherein the heating of the sheet is conducted so that the temperature of the sheet ranges from about 400° C. to about 510° C.*

*48. A method as set forth in claim 42 wherein the rate of increasing the pressure in the first stage is non-linear.*

*49. A method as set forth in claim 42 wherein the rate of increasing the pressure in the second stage is non-linear.*

*50. A method as set forth in claim 49 wherein the rate of increasing the pressure in the first stage is non-linear.*

*51. A method as set forth in claim 42 wherein the stretching further comprising applying a final stretching pressure stage after the second stage, and wherein pressure is increased during the final stretching pressure stage at a rate that is linear.*

*52. A method as set forth in claim 42 wherein the aluminum alloy comprising magnesium present in an amount, by weight, of about 1.0 percent to about 6 percent magnesium.*

*53. A method as set forth in claim 42 wherein the aluminum alloy comprising magnesium present in an amount, by weight, of up to 6 percent, and further comprising additional materials.*

*54. A method as set forth in claim 53 wherein the additional materials comprise an alloying component based on a metal*

*selected from the group consisting of manganese, chromium, copper, iron, silicon, and mixtures thereof.*

*55. A method as set forth in claim 42 wherein the stretching of the sheet into conformance with the forming surface is completed in less than 12 minutes.*

*56. A method of forming an article of manufacture from an aluminum alloy sheet comprising:*

*providing a sheet forming tool having engagement surfaces for engaging the sheet near peripheral edges thereof so that the sheet can be held in sealing engagement with the sheet forming tool, the sheet forming tool having a sheet forming surface for forming the sheet;*

*heating the sheet to a temperature ranging from about 400° C. to about 510° C. and holding the sheet in sealing engagement with the engagement surfaces of the sheet forming tool, the sheet having a first surface facing the sheet forming surface and an opposite surface;*

*stretching the heated sheet into conformance with the forming surface by applying working gas pressure, in a range of about 250 psi to about 500 psi above ambient pressure, to the opposite surface of the sheet, the stretching being accomplished by applying the pressure in a series of stages comprising a first stage, and a second stage; and wherein the first stage comprises increasing the pressure at a first average rate from ambient, and the second stage comprising increasing the pressure at a second average rate, and wherein the second stage occurs after the first stage and the second average rate is greater than the first average rate.*

*57. A method of forming an article of manufacture from an aluminum alloy sheet comprising:*

*providing a sheet forming tool having engagement surfaces for engaging the sheet near peripheral edges thereof so that the sheet can be held in sealing engagement with the sheet forming tool, the sheet forming tool having a sheet forming surface for forming the sheet;*

*heating the sheet and holding the sheet in sealing engagement with the engagement surfaces of the sheet forming tool, the sheet having a first surface facing the sheet forming surface and an opposite surface;*

*stretching the heated sheet into conformance with the forming surface by applying working gas pressure, in a range of about 250 psi to about 500 psi above ambient pressure, to the opposite surface of the sheet, the stretching being accomplished by applying the pressure in a series of stages comprising a first stage, and a second stage; and wherein the first stage comprises increasing the pressure at a first rate from ambient, and the second stage comprising increasing the pressure at a second rate, and wherein the second stage occurs after the first stage and the second rate is greater than the first rate, and wherein the aluminum alloy has a microstructure grain size of 5-30 micrometers.*

*58. A method of forming an article of manufacture from a metal alloy sheet comprising:*

*providing a sheet forming tool having engagement surfaces for engaging the sheet near peripheral edges thereof so that the sheet can be held in sealing engagement with the sheet forming tool, the sheet forming tool having a sheet forming surface for forming the sheet;*

*heating the sheet and holding the sheet in sealing engagement with the engagement surfaces of the sheet forming tool, the sheet having a first surface facing the sheet forming surface and an opposite surface;*

*stretching the heated sheet into conformance with the forming surface by applying working gas pressure to the opposite surface of the sheet, the stretching being accomplished by applying the pressure in a series of stages comprising a first stage, and a second stage; and wherein the first stage comprises increasing the pressure from ambient at a first rate to a first stage ending pressure, and the second stage comprising increasing the pressure at a second rate from the first stage ending pressure, and wherein the second rate is greater than the first rate, and wherein the second rate is non-linear, the stretching including a final stretching pressure in a range of about 250 psi to about 500 psi above ambient pressure.*

*59. A method of forming an article of manufacture from a metal alloy sheet comprising:*

*providing a sheet forming tool having engagement surfaces for engaging the sheet near peripheral edges thereof so that the sheet can be held in sealing engagement with the sheet forming tool, the sheet forming tool having a sheet forming surface for forming the sheet;*

*heating the sheet and holding the sheet in sealing engagement with the engagement surfaces of the sheet forming tool, the sheet having a first surface facing the sheet forming surface and an opposite surface;*

*stretching the heated sheet into conformance with the forming surface by applying working gas pressure, in a range of about 250 psi to about 500 psi above ambient pressure, to the opposite surface of the sheet, the stretching being accomplished by applying the pressure in a series of stages comprising a first stage, and a second stage; and wherein the first stage comprises increasing the pressure from ambient at a first rate to a first stage ending pressure, and the second stage comprising increasing the pressure at a second rate from the first stage ending pressure, and wherein the second rate is greater than the first rate, and wherein the second rate is non-linear, said stretching being accomplished such that at least a portion of the sheet experiences a strain rate greater than $10^{-3}$ $sec^{-1}$.*

*60. A method of forming an article of manufacture from a metal alloy sheet comprising:*

*providing a sheet forming tool having engagement surfaces for engaging the sheet near peripheral edges thereof so that the sheet can be held in sealing engagement with the sheet forming tool, the sheet forming tool having a sheet forming surface for forming the sheet;*

*heating the sheet and holding the sheet in sealing engagement with the engagement surfaces of the sheet forming tool, the sheet having a first surface facing the sheet forming surface and an opposite surface;*

*stretching the heated sheet into conformance with the forming surface by applying working gas pressure to the opposite surface of the sheet, the stretching being accomplished by applying the pressure in a series of nonlinear pressure increasing stages comprising at least a first stage and a second stage, and wherein the average rate of pressure increase in the first stage is greater than the average rate of pressure increase in the second stage, the stretching including a final stretching pressure in a range of about 250 psi to about 500 psi above ambient pressure.*

*61. A method of forming an article of manufacture from a metal alloy sheet comprising:*

*providing a sheet forming tool having engagement surfaces for engaging the sheet near peripheral edges thereof so that the sheet can be held in sealing engagement with the sheet forming tool, the sheet forming tool having a sheet forming surface for forming the sheet;*

*heating the sheet and holding the sheet in sealing engagement with the engagement surfaces of the sheet forming tool, the sheet having a first surface facing the sheet forming surface and an opposite surface;*

*stretching the heated sheet into conformance with the forming surface by applying working gas pressure to the opposite surface of the sheet, the stretching being accomplished by applying the pressure in a series of nonlinear pressure increasing stages comprising at least a first stage and a second stage, and wherein the average rate of pressure increase in the first stage is greater than the average rate of pressure increase in the second stage, the stretching including a final stretching pressure in a range of about 250 psi to about 500 psi above ambient pressure.*

*62. A method of forming an article of manufacture from an aluminum alloy sheet comprising:*

*providing a sheet forming tool having engagement surfaces for engaging the sheet near peripheral edges thereof so that the sheet can be held in sealing engagement with the sheet forming tool, the sheet forming tool having a sheet forming surface for forming the sheet;*

*heating the sheet and holding the sheet in sealing engagement with the engagement surfaces of the sheet forming tool, the sheet having a first surface facing the sheet forming surface and an opposite surface;*

*stretching the heated sheet into conformance with the forming surface by applying working gas pressure, in a range of about 250 psi to about 500 psi above ambient pressure, to the opposite surface of the sheet, the stretching being accomplished by applying the pressure in a series of stages comprising a first stage, and a second stage; and wherein the first stage comprises increasing the pressure at a first average rate from ambient, and the second stage comprising increasing the pressure at a second average rate, and wherein the second stage occurs after the first stage, and the second average rate is greater than the first average rate, the stretching being accomplished such that at least a portion of the sheet experiences a strain rate greater than $10^{-3}$ $sec^{-1}$.*

*63. A method of forming an article of manufacture from an aluminum alloy sheet comprising:*

*providing a sheet forming tool having engagement surfaces for engaging the sheet near peripheral edges thereof so that the sheet can be held in sealing engagement with the sheet forming tool, the sheet forming tool having a sheet forming surface for forming the sheet;*

*heating the sheet and holding the sheet in sealing engagement with the engagement surfaces of the sheet forming tool, the sheet having a first surface facing the sheet forming surface and an opposite surface;*

*stretching the heated sheet into conformance with the forming surface by applying working gas pressure to the opposite surface of the sheet, the stretching being accomplished by applying the pressure in a series of stages comprising a first stage, and a second stage; and wherein the first stage comprises increasing the pressure at a first average rate from ambient, and the second stage comprising increasing the pressure at a second average rate, and wherein the second stage occurs after the first stage, and the second average rate is greater than the first average rate, the stretching including a final stretching pressure in a range of about 250 psi to about 500 psi above ambient pressure.*

*64. A method of forming an article of manufacture from an aluminum alloy sheet comprising:*

*providing a sheet forming tool having engagement surfaces for engaging the sheet near peripheral edges thereof so that the sheet can be held in sealing engagement with the sheet forming tool, the sheet forming tool having a sheet forming surface for forming the sheet;*

*heating the sheet to a temperature ranging from about 400° C. to about 510° C. and holding the sheet in sealing engagement with the engagement surfaces of the sheet forming tool, the sheet having a first surface facing the sheet forming surface and an opposite surface;*

*stretching the heated sheet into conformance with the forming surface by applying working gas pressure, in a range of about 250 psi to about 500 psi above ambient pressure, to the opposite surface of the sheet, the stretching being accomplished by applying the pressure in a series of stages comprising a first stage, and a second stage; and wherein the first stage comprises increasing the pressure at a first average rate from ambient, and the second stage comprising increasing the pressure at a second average rate, and wherein the second stage occurs after the first stage and the second average rate is greater than the first average rate, the stretching being accomplished such that at least a portion of the sheet experiences a strain rate greater than $10^{-3}$ $sec^{-1}$.*

*65. A method of forming an article of manufacture from an aluminum alloy sheet comprising:*

*providing a sheet forming tool having engagement surfaces for engaging the sheet near peripheral edges thereof so that the sheet can be held in sealing engagement with the sheet forming tool, the sheet forming tool having a sheet forming surface for forming the sheet;*

*heating the sheet and holding the sheet in sealing engagement with the engagement surfaces of the sheet forming tool, the sheet having a first surface facing the sheet forming surface and an opposite surface;*

*stretching the heated sheet into conformance with the forming surface by applying working gas pressure to the opposite surface of the sheet, the stretching being accomplished by applying the pressure in a series of stages comprising a first stage, and a second stage; and wherein the first stage comprises increasing the pressure at a first rate from ambient, and the second stage comprising increasing the pressure at a second rate, and wherein the second stage occurs after the first stage and the second rate is greater than the first rate, and wherein the aluminum alloy has a microstructure grain size of 5-30 micrometers, the stretching including a final stretching pressure in a range of about 250 psi to about 500 psi above ambient pressure.*

*66. A method of forming an article of manufacture from an aluminum alloy sheet comprising:*

*providing a sheet forming tool having engagement surfaces for engaging the sheet near peripheral edges thereof so that the sheet can be held in sealing engagement with the sheet forming tool, the sheet forming tool having a sheet forming surface for forming the sheet;*

*heating the sheet and holding the sheet in sealing engagement with the engagement surfaces of the sheet forming tool, the sheet having a first surface facing the sheet forming surface and an opposite surface;*

*stretching the heated sheet into conformance with the forming surface by applying working gas pressure, in a range of about 250 psi to about 500 psi above ambient pressure, to the opposite surface of the sheet, the stretching being accomplished by applying the pressure in a series of stages comprising a first stage, and a second stage; and wherein the first stage comprises increasing*

*the pressure at a first rate from ambient, and the second stage comprising increasing the pressure at a second rate, and wherein the second stage occurs after the first stage and the second rate is greater than the first rate, and wherein the aluminum alloy has a microstructure grain size of 5-30 micrometers, the stretching being accomplished such that at least a portion of the sheet experiences a strain rate greater than $10^{-3}$ $sec^{-1}$.*

* * * * *